(12) United States Patent
Nakamura et al.

(10) Patent No.: US 7,774,508 B2
(45) Date of Patent: Aug. 10, 2010

(54) ELECTRONIC APPARATUS, CONTROL METHOD THEREOF, HOST DEVICE, AND CONTROL METHOD THEREOF

(75) Inventors: Seiji Nakamura, Osaka (JP); Tatsuya Adachi, Osaka (JP); Kazuya Iwata, Osaka (JP); Isao Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 207 days.

(21) Appl. No.: 10/582,084

(22) PCT Filed: Nov. 29, 2004

(86) PCT No.: PCT/JP2004/017724

§ 371 (c)(1),
(2), (4) Date: Jun. 8, 2006

(87) PCT Pub. No.: WO2005/057400

PCT Pub. Date: Jun. 23, 2005

(65) Prior Publication Data

US 2007/0145151 A1 Jun. 28, 2007

(30) Foreign Application Priority Data

Dec. 9, 2003 (JP) .............................. 2003-410840

(51) Int. Cl.
*G06F 3/00* (2006.01)
*G06K 5/00* (2006.01)
(52) U.S. Cl. .......................................... 710/5; 235/380
(58) Field of Classification Search ...................... 710/5
See application file for complete search history.

(56) References Cited

U.S. PATENT DOCUMENTS

| 5,905,245 | A | * | 5/1999 | Tanaka ........................ 235/375 |
| 6,006,289 | A | * | 12/1999 | James et al. .................. 710/35 |
| 6,036,100 | A | * | 3/2000 | Asami ......................... 235/492 |
| 6,199,120 | B1 | * | 3/2001 | Tanaka ......................... 710/16 |

(Continued)

FOREIGN PATENT DOCUMENTS

JP 61-228549 10/1986

(Continued)

OTHER PUBLICATIONS

Supplementary European Search Report issued Nov. 21, 2008 in the European Application No. 04820138.

*Primary Examiner*—Henry W. H. Tsai
*Assistant Examiner*—Titus Wong
(74) *Attorney, Agent, or Firm*—Wenderoth, Lind & Ponack, L.L.P.

(57) ABSTRACT

An electronic apparatus that transmits error information about setting of a block size to a host device includes an interface section that transmits and receives a command, a response and data to and from the host device. When the data is a predetermined length or more, the interface section executes multi-block transmission. Moreover, the electronic apparatus includes a data buffer, and a storage section that stores information about a block size. When the interface section receives a block size setting command transmitted from the host device and the block size is larger than a capacity of the data buffer, it transmits a response including error information about incapability of accepting the block size at the time which has a predetermined relation to the block size setting command.

16 Claims, 8 Drawing Sheets

U.S. PATENT DOCUMENTS

| | | | |
|---|---|---|---|
| 6,223,298 B1 * | 4/2001 | Tellier et al. | 713/501 |
| 2003/0006279 A1 * | 1/2003 | Saeki | 235/380 |
| 2003/0106942 A1 * | 6/2003 | Ohya et al. | 235/492 |
| 2004/0001406 A1 * | 1/2004 | Bahng | 369/47.39 |
| 2004/0122984 A1 | 6/2004 | Oyama et al. | |

FOREIGN PATENT DOCUMENTS

| | | |
|---|---|---|
| JP | 3-37540 | 4/1991 |
| JP | 10-27231 | 1/1998 |
| JP | 11-298450 | 10/1999 |
| JP | 2000-115258 | 4/2000 |
| JP | 2002-342256 | 11/2002 |
| JP | 2003-345674 | 12/2003 |

* cited by examiner

*Fig. 8A*   NORMAL RESPONSE

*Fig. 8B*   RESPONSE TO NEXT COMMAND

ELECTRONIC APPARATUS, CONTROL METHOD THEREOF, HOST DEVICE, AND CONTROL METHOD THEREOF

BACKGROUND OF THE INVENTION

1. Field of the Invention

The present invention relates to an electronic apparatus, a control method thereof, a host device, and a control method thereof.

2. Description of the Related Art

In recent years, IC (Integrated Circuit) cards (included in an electronic apparatus) having a non-volatile memory and another function have been developed and spread on the market. For example, a technique such that an IC card having a flash memory and a wireless communication function is attached to PDA (Personal Digital Assistants: host device), the IC card receives video data and audio data and transmits them to the PDA, and the PDA outputs the video data and the audio data from a display and a speaker thereof is being realized.

Conventionally, a function that a host device such as PDA transmits data to an IC card and the data are stored in a flash memory of the IC card is put to practical use.

In general, data transmission between a host device and an IC card is executed by means of a master/slave communication system in which the host device is a master. The host device transmits a command to the IC card, and accordingly the IC card returns a response to the host device. There are a host device and an IC card which can further transmit data as required after transmitting and receiving the command and the response respectively. The host device determines timing of the data transmission and a size of data, and accordingly the IC card receives or transmits the data.

One of the data transmissions between a host device and an IC card is a method called a multi-block transmission. The multi-block transmission is a method of, when data is a predetermined length or more (typically, a length of not less than a predetermined block size), (1) dividing the data into a plurality of data blocks with the predetermined block size and (2) intermittently transmitting the data blocks.

The host device determines a block size of one data block and transmits information about the block size to the IC card before transmitting the data. Concretely, the host device transmits a command (called as "the first block size setting command") including block size setting data of 1 byte to the IC card, and the IC card sets received block setting size data in a register of the IC card.

Generally, the host device reads a capacity of a data buffer for transmission and reception in the IC card from the IC card, and sets the block size to a size not more than the capacity.

However, general-purpose IC cards can be attached to various host devices. The host devices can be mounted with various IC cards (all the IC cards conform to the same standard). For this reason, some host devices occasionally may not read a capacity of a data buffer in an IC card or improperly read it and set a block size which is larger than the capacity of the data buffer in the IC card.

In case that a data block having larger size than the capacity of the data buffer is transmitted from the host device to the IC card, the data buffer of the IC card overflows. Further, in case that the host device requests the IC card to transmit the data block having larger size than the capacity of the data buffer, the IC card can not transmit the data block. For this reason, when the IC card receives the command of setting the block size larger than the capacity of the data buffer, the IC card should transmit error information to the host device.

When the host device receives the error information as a response to the command of setting the block size, it should newly transmit a command of setting a block size not more than the capacity of the data buffer.

The IC card receives the first block size setting command including the block size setting data. When the block size setting data are larger than a buffer capacity, the IC card transmits the response which corresponds to the first block size setting command and includes error information to the host device. As a result, the data buffer of the IC card is prevented from overflowing at the time of the transmission/reception of the block size in advance.

The case of transmitting data from the host device to the IC card (transmitting a data writing command from the host device to the IC card) is explained. Firstly, the host device divides data to be transmitted according to a predetermined block size so as to create a plurality of data blocks. Then, the host device sequentially transmits the plural data blocks to the IC card.

The case of transmitting data from the IC card to the host device (transmitting a data reading command from the host device to the IC card) is explained. Firstly, the IC card divides data to be transmitted according to a block size set by the host device so as to create a plurality of data blocks. Then, the IC card sequentially transmits the plural data blocks to the host device.

Since the plural data blocks are intermittently transmitted, the multi-block transmission is effective for transmitting a large amount of data at a high speed.

Japanese Patent Application Laid-Open No. 11-298450 discloses an IC card of a conventional example that transmits an error signal to a host device when an overflow occurs at the time of serial data transmission. The conventional IC card transmits the error signal to the host device without via a built-in CPU. The conventional IC card transmits error information to the host device when a built-in receiving data buffer overflows.

Patent Document 1: Japanese Patent Application Laid-Open No. 11-298450

DISCLOSURE OF THE INVENTION

Problems to be Solved by the Invention

Conventionally, the block size in the multi-block transmission is set only by means of the first block size setting command including the block size setting data. The block size setting data which can be included in the first block size setting command is determined to be 1 byte, for example, according to a protocol.

When the memory capacity of an IC card increases and a large amount of data is transmitted between the IC card and a host device, 1 byte is insufficient for the block size setting data. The host device, however, can not transmit data with block size of 2 bytes to the IC card by using the first block size setting command having a data area of only 1 byte.

Therefore, use of a command (called as "second block size setting command") such that the host device can transmit data with block size of not less than 2 bytes to the IC card is proposed in addition to using the conventional first block size setting command.

The second block size setting command does not include block size setting data therein. The second block size setting command is transmitted based on protocols such that (1) the host device transmits a command indicating that the block size setting data is transmitted, (2) the host device receives a response from the IC card, and (3) thereafter, the host device transmits the block size setting data.

The host device and the IC card exchange the command, the response and the data in this order. For this reason, when the block size setting data is larger than the capacity of the data buffer, the IC card can not transmit the response including the error information about the too large setting data.

When the second block size setting command is used and the block size setting data are larger than the capacity of the data buffer, the IC card can not transmit the error information as the response to the host device.

If both the first block size setting command and the second block size setting command are enabled to be used in order to set the block size, the error information about the setting of the block size is returned from the IC card to the host device in some occasions and is not returned in the other occasions according to commands to be used. For this reason, a design of the host device becomes complicated.

The data transmission timing is, therefore, set before the response, and thus it is considered that the command, the data and the response are exchanged in this order. If the host device transmits the block size setting command to the IC card according to the protocols, the IC card receives the block size setting data before returning the response. For this reason, when the block size is too large, the IC card can return the error information as the response.

In the data transmission according to the protocols, however, in case that an error is present in a command (for example, the command is for transmitting data which cannot be treated by the IC card from the host device), the IC card cannot immediately return the error information as the response. For this reason, much data are transmitted wastefully.

The conventional IC card described in the patent document 1 receives data and when the received data buffer overflows, it transmits an error signal to the host device. For this reason, the transmission of the data from the host device is useless. The host device must transmit the data which cannot be received by the IC card again. If the IC card can transmit error information such that the overflow occurs to the host device before the host device transmits the data, the problem that wasteful data are transmitted (the data which cannot be received by the IC card are transmitted) can be prevented in advance.

The present invention is devised to solve the above conventional problems and its object is to provide an electronic apparatus that, when a host device transmits block size setting data according to a protocol such that a command, a response and data are transmitted in this order between the host device and an electronic apparatus (for example, IC card), and the electronic apparatus cannot accept the block size setting data, the electronic apparatus transmits error information to the host device, a control method thereof, a corresponding host device and a control method thereof.

It is an object of the present invention to provide an electronic apparatus that transmits error information about setting of block size to a host device at predetermined timing regardless of a type of a block size setting command, a control method thereof, a corresponding host device and a control method thereof.

It is an object of the present invention to provide an electronic apparatus that transmits error information about setting of block size to a host device without making a design of the host device complicated, a control method thereof, a host device and a control method thereof.

It is an object of the present invention to provide an electronic apparatus that prevents an overflow of a data buffer for transmission/reception of the electronic apparatus in advance, a control method thereof, a host device and a control method thereof.

It is an object of the present invention to provide an electronic apparatus wherein a general-purpose host device and a general-purpose electronic apparatus can be combined with compatibly, a control method thereof, a host device and a control method thereof.

Means for Solving the Problems

In order to achieve the above objects, the present invention has the following constitution.

An electronic apparatus in accordance with one aspect of the present invention includes: an interface section that is connected to a command/response line for receiving a command from a host device and transmitting a response to the host device and a data line for transmitting and receiving data according to the command as required after transmitting and receiving the command and the response to and from the host device via the command/response line. The data is transmitted or received while the data is divided into data blocks with a block size specified by the host device when the data length is a predetermined length or more. Moreover, the electronic apparatus includes a data buffer that stores the data and a storage section that stores information about the block size when the interface section receives a command for specifying the block size of the data block from the host device. When the interface section receives a command (hereinafter, "block size setting command") for transmitting data including information about the block size of the data block via the data line from the host device, and when the block size is lager than a capacity of the data buffer, the interface section transmits a response including error information about incapability of accepting the block size at a time which has a predetermined relation to the block size setting command.

A control method of an electronic apparatus in accordance with one aspect of the present invention includes the steps of: receiving a block size setting command transmitted from a host device via a command/response line, where the block size setting command is a request for transmitting data including information about a block size of the data block via a data line when data with a predetermined length or more are divided into a plurality of data blocks and the data blocks are transmitted or received. Moreover the method includes transmitting a response corresponding to the block size setting command via the command/response line and receiving the data, determining whether the block size is larger than a capacity of a built-in data buffer, and transmitting a response including error information about incapability of accepting the block size at the time which has a predetermined relation to the block size setting command.

The block size setting command is a "second block size setting command" in an embodiment.

These inventions can realize the electronic apparatus and the control method thereof, wherein, in a case that the host device transmits the block size setting data according to a protocol such that the host device and the electronic apparatus (for example, IC card) transmit a command, a response and data in this order, when the electronic apparatus cannot accept the block size setting data, the electronic apparatus transmits error information to the host device.

These inventions realize the electronic apparatus that transmits the error information about the setting of the block size at predetermined timing to the host device without making a design of the host device complicated and the control method thereof.

In the electronic apparatus in accordance with another aspect of the present invention, the time which has a predetermined relation is the time when the electronic apparatus receives a command for actually transmitting or receiving the data blocks with the block size created by dividing the data with the predetermined length or more from the host device. The electronic apparatus transmits the response to the command with the error information included in the response, and does not accept the data blocks when receiving the divided data blocks from the host device.

In the control method of the electronic apparatus, the time which has a predetermined relation is the time when the electronic apparatus receives a command for actually transmitting or receiving the data blocks with the block size created by dividing the data with the predetermined length or more from the host device. The electronic apparatus transmits the response to the command with the error information included in the response and does not accept the data blocks when receiving the divided data blocks from the host devices.

According to these inventions, the host device receives the response to "the command for actually transmitting or receiving the data blocks", and can check the error information about the setting of the block size. As a result, the host device can receive the error information from the electronic apparatus without making the design of the host device complicated.

In the electronic apparatus in accordance with another aspect of the present invention, the time which has a predetermined relation is the time when the electronic apparatus receives a command next to the block size setting command transmitted from the host device. The electronic apparatus adds the response including the error information to the response corresponding to the next command, and then transmits the response.

In the control method of the electronic apparatus in accordance with another aspect of the present invention, the time which has the predetermined relation is the time when the electronic apparatus receives a command next to the block size setting command transmitted from the host device, and the electronic apparatus adds a response including the error information to the response corresponding to the next command, and then transmits the response.

According to these inventions, the host device receives the response to a command next to the block size setting command, and can check the error information about the setting of the block size. As a result, the host device can receive the error information from the electronic apparatus without making the design of the host device complicated.

In the electronic apparatus in accordance with still another aspect of the present invention, in a case that the interface section receives a command including information about the block size of the data block from the host device via the command/response line and the block size is larger than the capacity of the data buffer, when the electronic apparatus receives a command for actually transmitting or receiving the data blocks with the block size created by dividing the data with the predetermined length or more from the host device, the electronic apparatus transmits a response corresponding to the command and including error information about incapability of accepting the block size. When the divided data blocks are transmitted from the host device, the electronic apparatus does not accept the data blocks, or the electronic apparatus adds information about the error response corresponding to the command for specifying the block size to a response corresponding to a next command transmitted from the host device, and then transmits the response.

In the control method of the electronic apparatus in accordance with still another aspect of the present invention, further has a step of receiving a command including information about the block size of the data block from the host device via the command/response line. In a case that the determination is made that the block size is larger than the capacity of the data buffer at the determining step, when the electronic apparatus receives a command for actually transmitting or receiving the data blocks with the block size created by dividing the data with the predetermined length or more from the host device, the electronic apparatus transmits a response corresponding to the command and including error information about incapability of accepting the block. When the divided data blocks are transmitted from the host device, the electronic apparatus does not accept the data blocks, or the electronic apparatus adds information about the error response corresponding to the command for specifying the block size to the response corresponding to the next command transmitted from the host device, and then transmits the response.

"The command including information about the block size of the data block" which is received by the electronic apparatus via the command/response line is "a first block size setting command" in an embodiment.

According to these inventions, similarly to a second block size setting command, a response to a predetermined command after a first block size setting command includes response to the first block size setting command. The host device can receive error information about the block size at constant timing regardless of types of block size setting commands to be transmitted.

These inventions realize the electronic apparatus that transmits the error information about the setting of the block size to the host device without making the design of the host device complicated and the control method thereof.

The electronic apparatus according to still another aspect of the present invention is an IC card.

In the control method of the electronic apparatus according to still another aspect of the present invention, the electronic apparatus is an IC card.

These inventions are effective in the general-purpose ICs card having various product variations.

A host device in accordance with one aspect of the present invention includes: an interface section that is connected to a command/response line for transmitting a command to an electronic apparatus and receiving a response from the electronic apparatus, and a data line for transmitting and receiving data according to the command as required after transmitting and receiving the command and the response to and from the electronic apparatus via the command/response line. When the data is a predetermined length or more, the interface section transmits and receives data blocks with a predetermined block size created by dividing the data, and transmits a command for specifying the block size to the electronic apparatus. The interface section transmits a block size setting command for transmitting data including information about the block size of the data blocks via the data line to the electronic apparatus, after the data are transmitted, at the time which has a predetermined relation to the block size setting command, when receiving a response including error information about incapability of accepting a specified value of the block size of the data from the electronic apparatus. The interface section transmits a command for inquiring about a data capacity of a data buffer to the electronic apparatus, determines a new block size which is not more than the capacity of the data buffer in the electronic apparatus based on the response, and transmits a command for specifying the new block size to the electronic apparatus.

A control method of a host device in accordance with one aspect of the present invention includes the steps of: transmitting a block size setting command via a command/response line to an electronic apparatus, the block size setting command being a request for transmitting data including information about a block size of the data block via a data line when the data with a predetermined length or more are divided into a plurality of data blocks and transmitted or received, receiving a response corresponding to the block size setting command via the command/response line, and transmitting the data. Moreover, the method includes transmitting a command for inquiring about a data capacity of a data buffer to the electronic apparatus when a response including error information about incapability of accepting the block size is received at the time which has a predetermined relation to the block size setting command, and determining a new block size which is not more than the capacity of the data buffer in the electronic apparatus based on a response corresponding to the inquiring command and transmitting a command for specifying the new block size to the electronic apparatus.

These inventions have effects which can realize the host device having a simple structure and the control method thereof which function such that: (1) the host device connected to the electronic apparatus (for example, IC card) transmits the block size setting data; and (2) when the electronic apparatus transmits the error information such that it cannot accept the block size setting data, the host device changes the block size setting data suitably so that multi-block transmission is executed.

In the host device in accordance with another aspect of the present invention, the time which has the predetermined relation is the time when the host device transmits a command for actually transmitting or receiving the data created by dividing the data with the predetermined length or more according to the block size to the electronic apparatus.

In the control method of the host device in accordance with another aspect of the present invention, the time which has the predetermined relation is the time when the host device transmits a command for actually transmitting or receiving the data created by dividing the data with the predetermined length or more according to the block size to the electronic apparatus.

According to these inventions, the host device receives a response to a command for actually transmitting or receiving the data created by dividing the data with the predetermined length or more according to the block size, and can check the error information about the setting of the block size. As a result, the host device can receive the error information from the electronic apparatus without making the design of the host device complicated.

In the host device in accordance with another aspect of the present invention, the time which has the predetermined relation is the time when the host device transmits a command next to the block size setting command to the electronic apparatus.

In the control method of the host device in accordance with another aspect of the present invention, the time which has the predetermined relation is the time when the host device transmits a command next to the block size setting command to the electronic apparatus.

According to these inventions, the host device receives the response to a command next to the block size setting command, and can check the error information about the setting of the block size. As a result, the host device can receive the error information from the electronic apparatus without making the design of the host device complicated.

EFFECTS OF THE INVENTION

The present invention can realize the electronic apparatus, the control method thereof, the corresponding host device and the control method thereof wherein when the host device transmits the block size setting data according to a protocol such that a command, a response and data are transmitted in this order between the host device and the electronic apparatus (for example, IC card) and the electronic apparatus cannot accept the block size setting data, it transmits error information to the host device.

The present invention can realize the electronic apparatus which transmits the error information about the setting of the block size to the host device at predetermined timing regardless of types of the block size setting commands, the control method thereof, the corresponding host device and the control method thereof.

The present invention can realize the electronic apparatus which transmits the error information to the host device without limiting the types of the block size setting command to one type and without making the design of the host device, the control method thereof, the corresponding host device and the control method thereof.

The present invention can realize the electronic apparatus, the control method thereof, the corresponding host device and the control method thereof, wherein overflow of the data buffer for transmission/reception of the IC card is prevented in advance.

The present invention can realize the electronic apparatus, the control method thereof, the host device and the control method thereof, wherein the general-purpose host device and the general-purpose electronic apparatus can be combined with compatibility.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF REFERENCE NUMERALS

101 Host device
102 IC card
111 Interface section
112 Error information creating section
113 Data buffer
114 Function module
121 Block size storage section
122 Buffer capacity storage section
123 Comparison section
124 Response creating section It will be recognized that some or all of the drawings are schematic representations for purposes of illustration and do not necessarily depict the actual relative sizes or locations of the elements shown.

DETAILED DESCRIPTION OF THE INVENTION

The preferred embodiments according to the present invention will be described below with reference to the accompanying drawings.

First Embodiment

Figure 1:
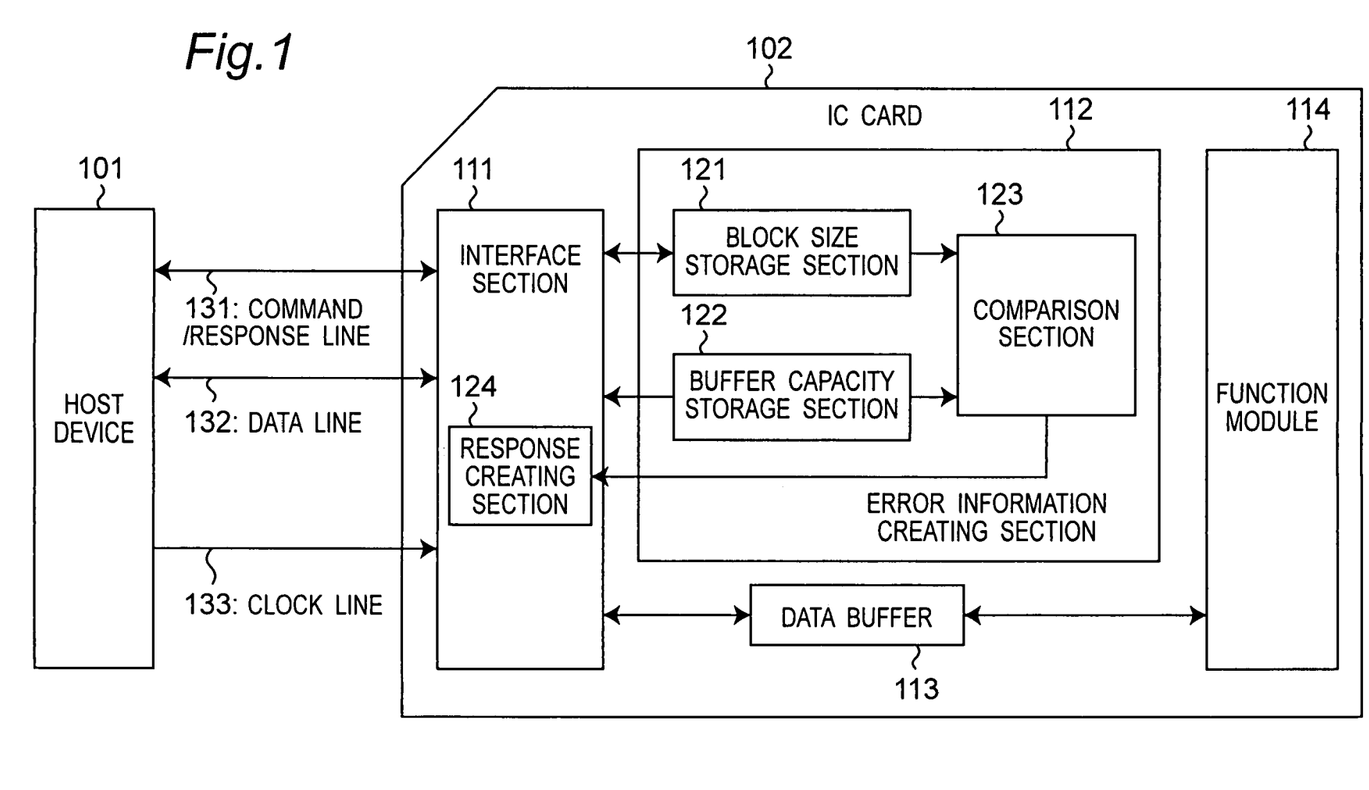
FIG. 1 is a block diagram showing a configuration of an IC card according to a first embodiment of the present invention.

With reference to FIGS. 1 to 5, an electronic apparatus (in the present invention, an IC card), a control method thereof, a host device and a control method thereof according to a first embodiment of the present invention are described. FIG. 1 is a block diagram showing a configuration of an IC card according to the first embodiment of the present invention.

In the first embodiment, a host device 101 is a PDA (Personal Digital Assistant) having a slot for inserting the IC card 102.

The host device 101 is connected with the IC card 102 through a command/response line 131, one or plural data line(s) 132, and a clock line 133 for transmitting a communication clock from the host device 101 to an interface section 111. The host device 101 and the IC card 102 are connected by the other lines including a power source line for supplying an electric power from the host device 101 to the IC card 102 and a ground line (not shown).

The command/response line 131, the data line 132 and the clock line 133 can be used as electromagnetic wave transmission and ultrasonic transmission by means of different frequencies as well as hard wires.

The host device 101 and the IC card 102 communicate with each other according to a master/slave system in which the host device 101 is a master and the IC card 102 is a slave.

The host device 101 has an interface section (not shown) which uses the command/response line 131, the data line 132 and the clock line 133 so as to transmit/receive a command, a response and data to/from the IC card 102.

The IC card 102 has the interface section 111 that transmits/receives a command, a response and data to/from the host device 101, an error information creating section 112 that creates error information about a block size, a data buffer 113 that temporarily stores data, and a function module 114 having a memory function and/or a wireless communication function.

The error information creating section 112 has a block size storage section 121 that stores a block size determined by the host device 101, a buffer capacity storage section 122 that stores a size of the data buffer 113, and a comparison section 123 that compares the block size with the buffer capacity.

The interface section 111 has a response creating section 124 that creates a response and transmits it to the host device 101.

The interface section 111 of the IC card 102 receives a command transmitted from the host device 101 via the command/response line 131, and transmits a response corresponding to the command to the host device 101.

The interface section 111 of the IC card 102 receives data transmitted from the host device 101 via the data line 132, or transmits data in the IC card to the host device 101.

When the host device 101 communicates with the IC card 102 via the command/response line 131 and the data line 132, a clock is sent from the host device 101 to the IC card 102 via the clock line 133.

When multi-block transmission is carried out, the host device 101 determines a block size of one data block so as to write the block size into the block size storage section 121 of the IC card before the host device 101 transmits/receives the data block. The block size storage section 121 is a register into which the host device 101 writes a block size.

The buffer capacity storage section 122 is a register that stores the capacity of the data buffer 113.

The comparison section 123 compares the block size written into the block size storage section 121 with the buffer capacity written into the buffer capacity storage section 122. The comparison section 123 transmits a compared result to the response creating section 124.

When the compared result shows that the block size written into the block size storage section 121 is larger than the capacity of the data buffer 113 written into the buffer capacity storage section 122, error information is incorporated in the response by the response creating section 124 and then is transmitted to the host device 101.

The IC card 102 temporarily stores the data block transmitted from the host device 101 via the data line 132 into the data buffer 113 and transmits it to the function module 114. The IC card 102 temporarily stores the data block read out from the function module 114 into the data buffer 113 and transmits it to the host device 101.

The data buffer 113 is a register that temporarily stores the data block.

The function module 114 is a function module with, for example, a flash memory and a wireless communication function.

In FIG. 1, the line between the interface section 111 and the block size storage section 121, the line between the interface section 111 and the buffer capacity storage section 122, the line between the block size storage section 121 and the comparison section 123, the line between the buffer capacity storage section 122 and the comparison section 123, the line between the comparison section 123 and the response creating section 124, the line between the interface section 111 and the data buffer 113, and the line between the data buffer 113 and the function module 114 may be hard wires. However, more generally each line is a command route of functions composed of operations of software.

Figure 2:
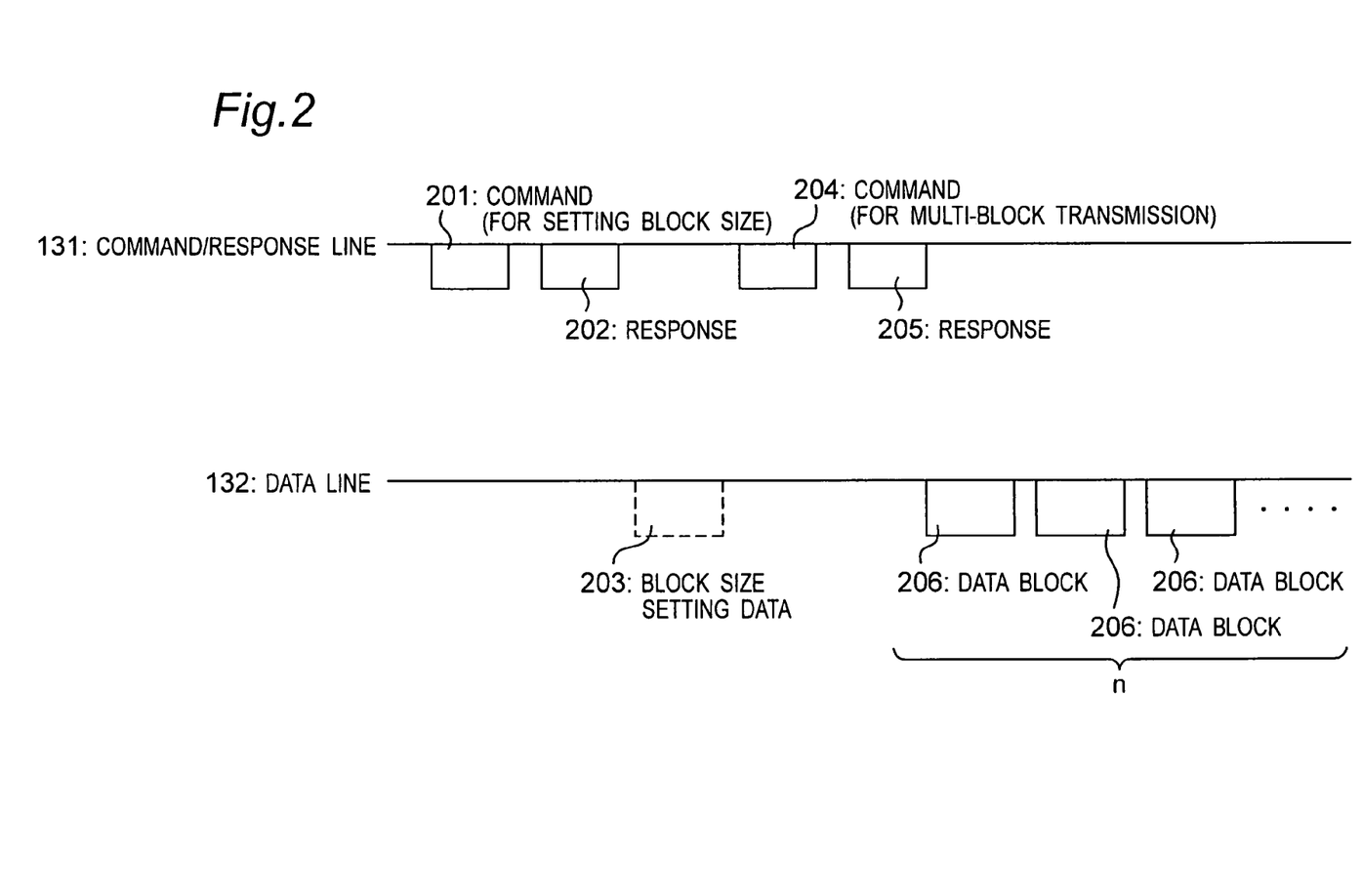
FIG. 2 is a diagram showing transmission of a command, a response and data according to the first embodiment of the present invention.

FIG. 2 is a diagram showing exchange of a command, a response and data between the host device 101 and the IC card 102 in a time series. When the multi-block transmission is carried out according to the master/slave communication system in which the host device 101 is a master and the IC card 102 is a slave, a command from the host device to the IC card and a response from the IC card to the host device are transmitted alternately. Thereafter, a plurality of data blocks are intermittently transmitted. FIG. 2 illustrates the case that the host device 101 reads data from the IC card 102.

A command 201, a command 204, and block size setting data 203 are transmitted from the host device 101 to the IC card 102. A response 202, a response 205 and a data block 206 are transmitted from the IC card 102 to the host device 101.

In case, however, that the command 201 is a first block size setting command, the block size setting data 203 shown by a broken line is not transmitted from the host device to the IC card (details are mentioned later). Only in the case that the command 201 is a second block size setting command, are the block size setting data 203 transmitted from the host device to the IC card.

Figure 3:
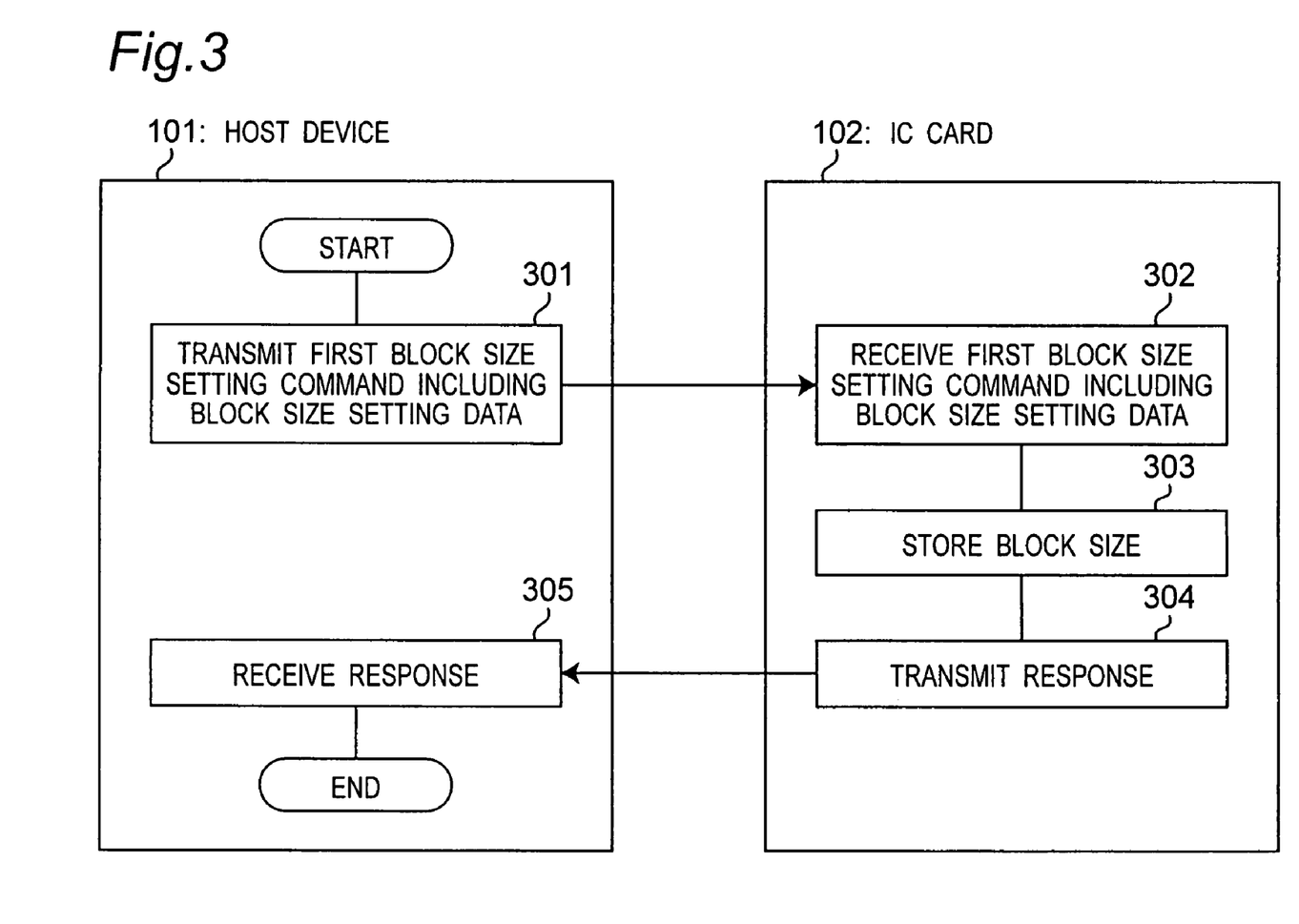
FIG. 3 is a flowchart showing a first block size setting method according to the first embodiment of the present invention.
Figure 4:
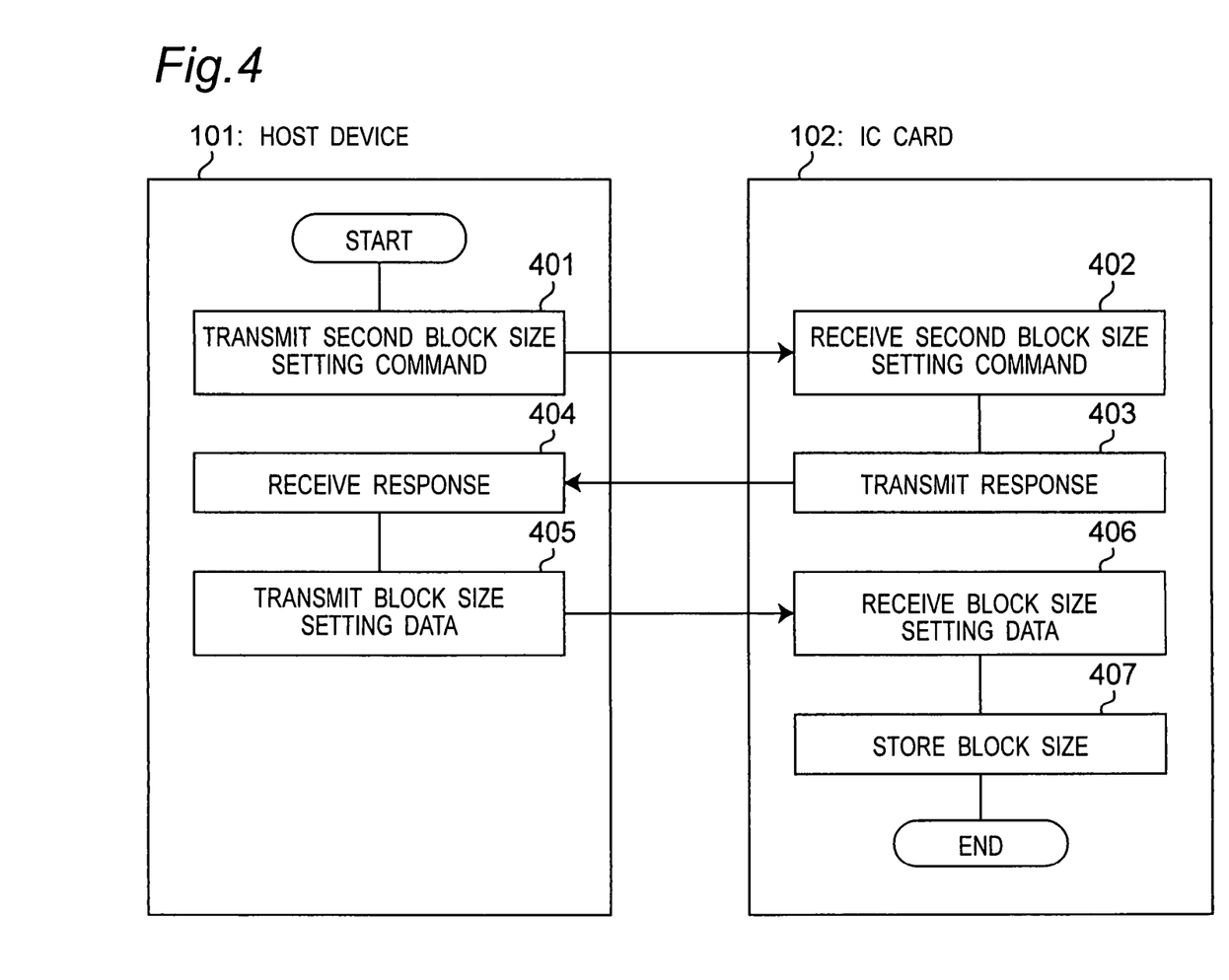
FIG. 4 is a flowchart showing a second block size setting method according to the first embodiment of the present invention.

FIG. 3 and FIG. 4 are flowcharts of two cases that the host device 101 sets block size in the IC card 102 in this embodiment. Two types of commands shown in FIGS. 3 and 4 are used when the host device 101 sets the block size. A difference between the case of FIG. 3 and the case of FIG. 4 is that the command includes the block size setting data or not.

The case of FIG. 3 is firstly explained. FIG. 3 shows the case that the block size is set by the first block size setting command including the setting data.

The host device 101 determines the block size of one data block, and transmits the first block size setting command including the block size setting data (step 301, numeral 201 in FIG. 2).

The interface section 111 of the IC card receives the first block size setting command (step 302). The block size storage section 121 of the IC card 102 stores the block size set by the host device 101 (step 303). The IC card 102 transmits a response to the host device 101 (step 304, numeral 202 in FIG. 2).

The host device 101 receives the response 202 (step 305).

In the case of FIG. 3, since the first block size setting command (numeral 201 in FIG. 2) includes the block size setting data, the block size setting data 203 shown in FIG. 2 is not transmitted from the host device 101 to the IC card 102.

In the first embodiment, the comparison section 123 outputs a result of determining whether the received block size is not more than the buffer capacity. The interface section 111 of the IC card inputs the determined result of the comparison section 123 at step 304, and may transmit a response (Ack information or error information) to the first block size setting command based on the determined result. In another way, the interface section 111 of the IC card may transmit Ack information as the response without reference to the determined result of the comparison section 123.

The case of FIG. 4 is described. FIG. 4 illustrates the case that the block size is set by a second block size setting command which does not include the block size setting data.

The host device 101 determines a block size of one data block, and transmits the second block size setting command (step 401, numeral 201 in FIG. 2).

The interface section 111 of the IC card receives the second block size setting command (step 402). The IC card 102 transmits a response to the host device 101 (step 403, numeral 202 in FIG. 2).

The host device 101 receives the response 202 (step 404). The host device 101 transmits the block size setting data via the data line 132 (step 405, numeral 203 in FIG. 2).

The IC card receives the block size setting data 203 (step 406). The block size storage section 121 of the IC card 102 stores the block size set by the host device 101 (step 407).

Figure 5:
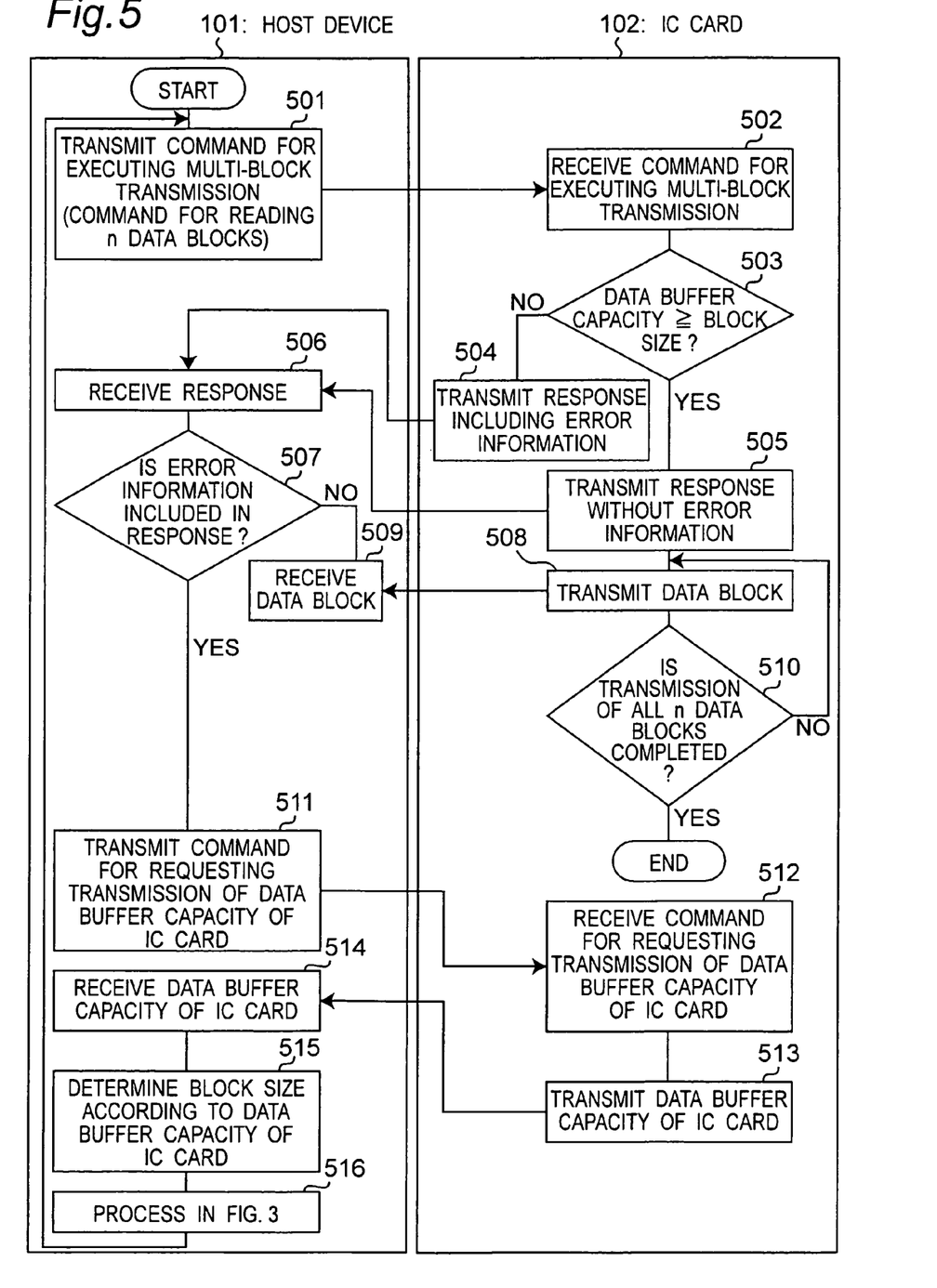
FIG. 5 is a flowchart showing a multi-block transmitting method according to the first embodiment of the present invention.

The host device 101 uses one of the first block size setting command (FIG. 3) and the second block size setting command (FIG. 4) so as to set the block size in the IC card 102, and next, a process in FIG. 5 is executed.

FIG. 5 is a flowchart showing the multi-block transmission between the host device 101 and the IC card 102. The multi-block transmission in FIG. 5 corresponds to the case that the host device 101 reads data from the IC card 102.

The host device 101 transmits a command for executing multi-block transmission (instruction of reading n (positive integer which establishes a relation: $n \geqq 1$)) data blocks) (step 501, numeral 204 in FIG. 2). The IC card 102 receives the command for executing the multi-block transmission (step 502).

The comparison section 123 of the IC card 102 compares the block size stored in the block size storage section 121 with the size of the data buffer 113 stored in the buffer capacity storage section 122 (step 503).

When the size of the data buffer 113 is less than the block size, the response creating section 124 creates a response including the error information. The interface section 111 transmits the response including the error information (step 504, numeral 205 in FIG. 2). In this case, the IC card 102 does not transmit n data blocks 206 to the host device 101.

When the size of the data buffer 113 is not less than the block size, the response creating section 124 creates a response without error information so as to transmit the response to the host device (step 505, numeral 205 in FIG. 2). The IC card transmits the data blocks to the host device (step 508, numeral 206 in FIG. 2).

The host device 101 receives the response (step 506). The host device 101 determines whether the response 205 includes error information (step 507). When the response does not include error information, the host device receives the data blocks (step 509).

The IC card 102 determines whether all the n data blocks are transmitted (step 510). The IC card 102 repeats the transmission of the data blocks at step 508 until all the n data blocks are transmitted. When the transmission of all the n data blocks is completed, the process is ended.

When the response includes error information at step 507, the host device 101 transmits a command for requesting transmission of a data buffer capacity of the IC card 102 (step 511).

The IC card 102 receives the command for requesting transmission of the data buffer capacity of the IC card (step 512), and transmits the capacity of the data buffer 113 stored in the buffer capacity storage section 122 to the host device 101 (step 513).

The host device 101 receives the data buffer capacity of the IC card (step 514), and determines a new block size which is not more than the data buffer capacity (step 515). The host device 101 transmits a new block size to the IC card according to the method in FIG. 3 (step 516). The sequence returns to step 501, and the multi-block transmission is re-executed.

The block size may be transmitted to the IC card according to the method in FIG. 4 instead of the process in FIG. 3 at step 516.

The IC card 102 of the present invention can be attached to various kinds of the compatible host devices 101. In case that the block size is determined after the host device 101 properly reads the capacity of the data buffer 113 of the IC card, the IC card 102 does not overflow. Some kinds of the host devices 101, however, do not read the capacity of the data buffer of the IC card and set the block size, or they can not properly read the capacity of the data buffer and thus occasionally set a value larger than the data buffer capacity as the block size.

Even in such a case, before the IC card 102 actually transmits/receives a data block, it can inform the host device of error information such that the block size is larger than the capacity of the data buffer. The IC card 102 of the present invention can prevent the data buffer 113 from overflowing in advance.

In both the cases that the block size is determined by using the first block size setting command (FIG. 3) and by the second block size setting command (FIG. 4), the IC card 102 of the present invention transmits the response including error information to the host device 101 at the same timing (step 504 in FIG. 5). Accordingly, the host device can determine whether the response includes the error information about the block size or not only at step 507. The control method of the electronic apparatus of the present invention can facilitate the design of the host device.

In the first embodiment, although the multi-block transmission in case of reading data from the IC card is explained, the present invention can be applied to the multi-block transmission in case of writing data into the IC card 102 by the host device 101.

In this case, when the block size set by the host device is larger than the capacity of the built-in data buffer, the IC card transmits the response including error information to the command for executing the multi-block transmission to the host device. When a data block is transmitted from the host device, the IC card does not accept it.

When the response includes error information corresponding to the command for executing the multi-block transmission, the host device does not transmit the data block to the IC card. The host device inquires about the data buffer capacity of the IC card so as to set a new block size.

Second Embodiment

With reference to FIGS. 6 to 9, the electronic apparatus according to a second embodiment (in the present invention, the IC card), the control method thereof, the host device and the control method thereof are described. A difference of the second embodiment from the first embodiment is the timing of transmitting error information such that block size is larger than the capacity of the data buffer 113 to the host device. The other points are the same as those in the first embodiment.

The commands which are used for setting a block size by the host device 101, include two kinds of commands ("the first block size setting command" and "the second block size setting command") which are similar to those in the first embodiment.

In the first embodiment, even when the host device 101 determines a block size by either the first block size setting command or the second block size setting command, the IC card 102 transmits the error information about the block size included in the response after the multi-block transmission command. For this reason, the timing of transmitting the error information by the IC card is delayed.

The second embodiment provides the electronic apparatus that transmits error information about a block size immediately, the control method thereof, the host device and the control method thereof. In the electronic apparatus, the control method thereof, the host device and the control method thereof according to the second embodiment, the timing that the error information is incorporated in the response is varied according to types of the block size setting commands.

Figure 6:
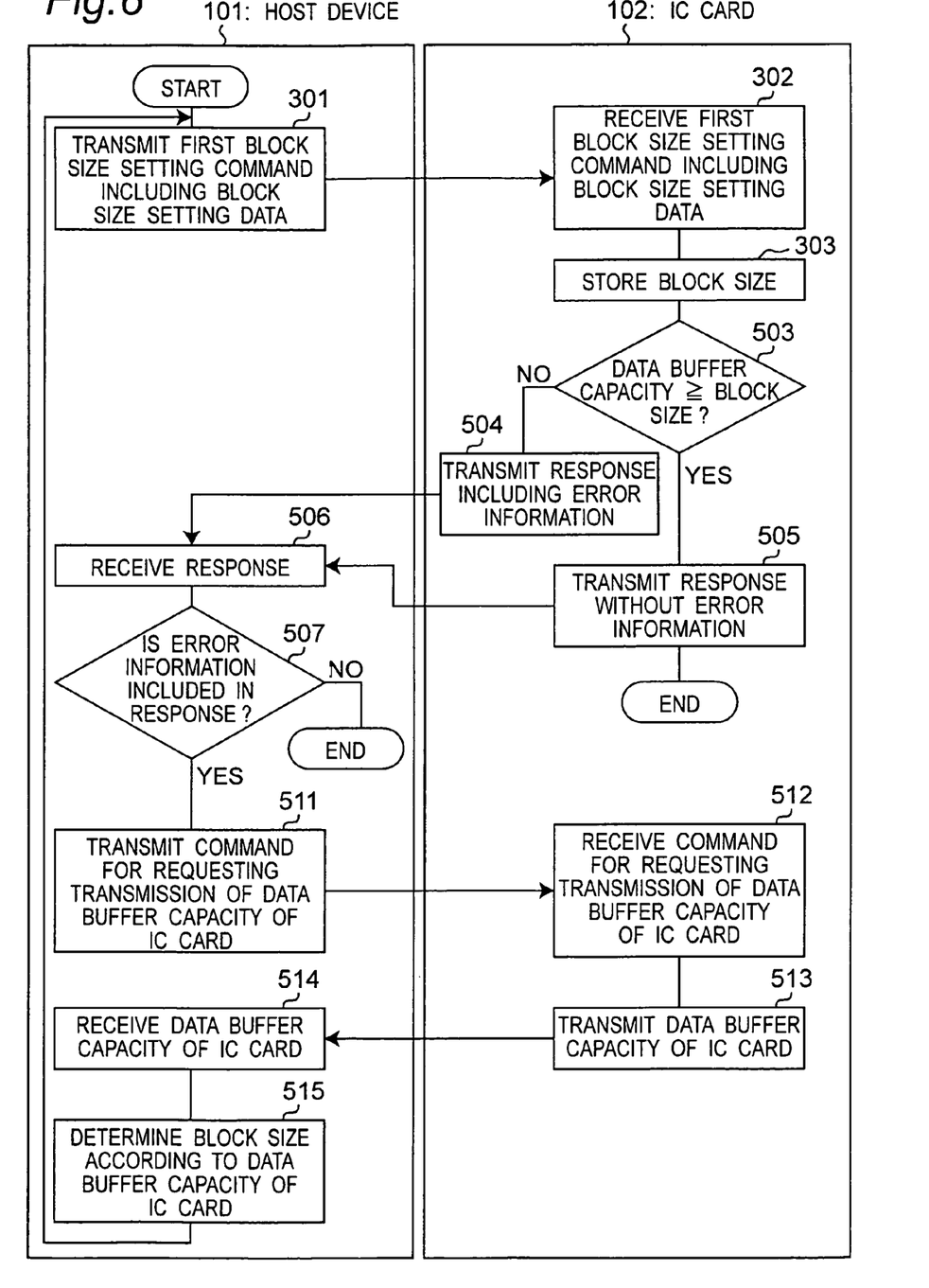
FIG. 6 is a flowchart showing a first block size setting method according to a second embodiment of the present invention.

FIG. 6 is a flowchart showing a method in which the host device sets a block size in the IC card by using the first block size setting command including block size setting data. In FIG. 6, the same steps as FIGS. 3 and 5 are designated by the same reference numerals in FIGS. 3 and 5.

The host device 101 transmits the first block size setting command including the block size setting data (step 301, numeral 201 in FIG. 2).

The interface section 111 of the IC card 102 receives the first block size setting command (step 302). The block size storage section 121 of the IC card 102 stores the block size set by the host device 101 (step 303).

The comparison section 123 of the IC card 102 compares the block size stored in the block size storage section 121 with the size of the data buffer 113 stored in the buffer capacity storage section 122 (step 503).

When the size of the data buffer 113 is less than the block size, the response creating section 124 creates a response which includes error information and the interface section 111 transmits the response (step 504, numeral 202 in FIG. 2). When the size of the data buffer 113 is not less than the block size, the response creating section 124 creates the response without error information, and the interface section 111 transmits it to the host device (step 505, numeral 202 in FIG. 2).

In case of FIG. 6, since the first block size setting command (numeral 201 in FIG. 2) includes the block size setting data, the block size setting data 203 shown in FIG. 2 is not transmitted from the host device 101 to the IC card 102.

The host device 101 receives the response 202 (step 506). The host device 101 determines whether the response includes error information or not (step 507). When the response does not include error information, the process is ended. When the response includes error information, the host device 101 transmits the command for requesting transmission of the data buffer capacity of the IC card 102 (step 511).

When the IC card 102 receives the command for requesting transmission of the data buffer capacity of the IC card (step 512), it transmits the capacity of the data buffer 113 stored in the buffer capacity storage section 122 to the host device 101 (step 513).

When the host device 101 receives the data buffer capacity of the IC card (step 514), it determines a new block size which is not more than the data buffer capacity (step 515). The sequence returns to step 301, and the host device 101 transmits the new block size to the IC card so as to set the block size.

Figure 7:
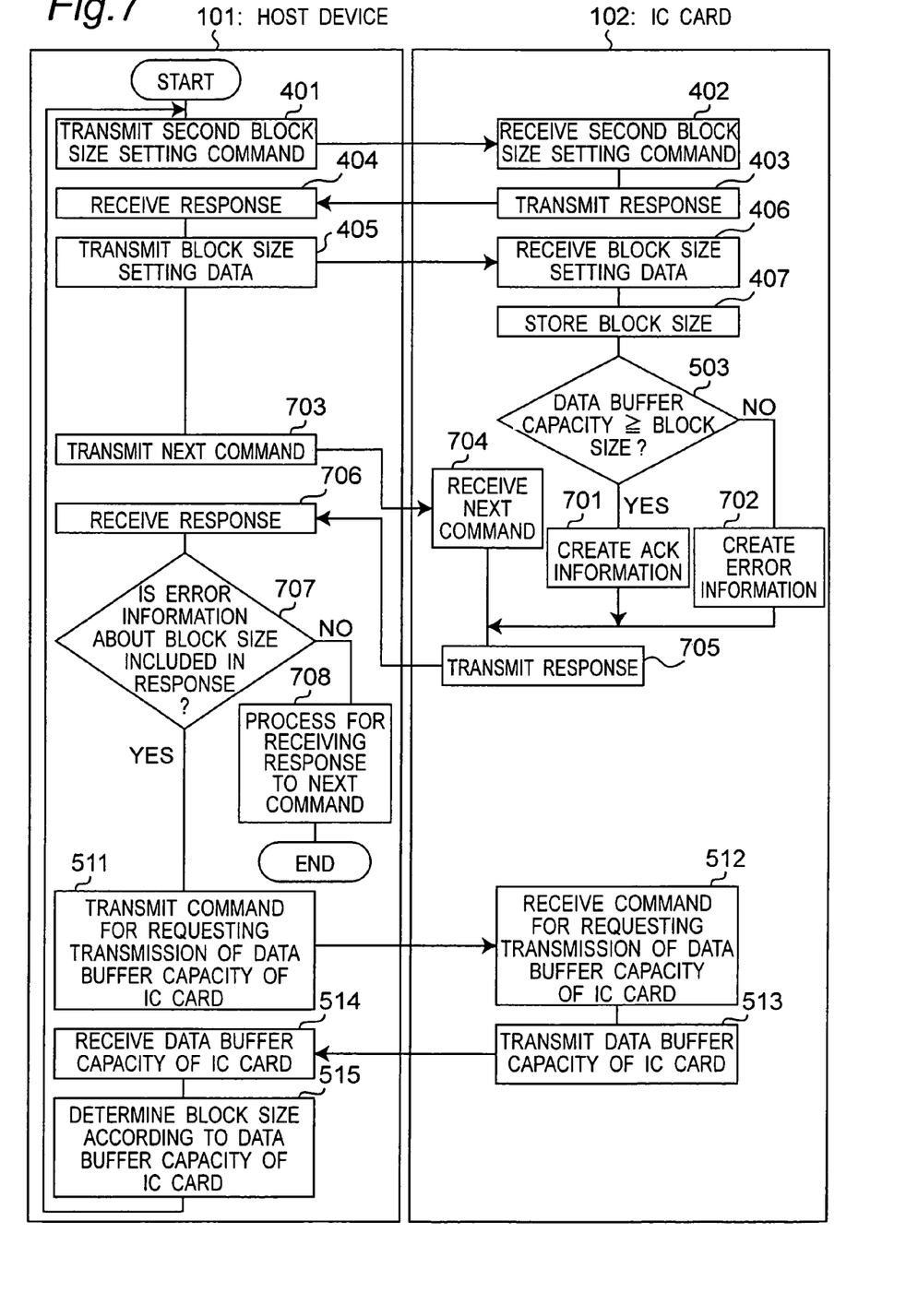
FIG. 7 is a flowchart showing a second block size setting method according to the second embodiment of the present invention.

With reference to FIGS. 7 and 8, the case of using the second block size setting command is described. FIG. 7 is a flowchart showing a method in which the host device sets a block size in the IC card by using the second block size setting command which does not include block size setting data. In FIG. 7, the same steps as FIGS. 4 and 5 are designated by the same reference numerals in FIGS. 4 and 5.

Figure 8A:
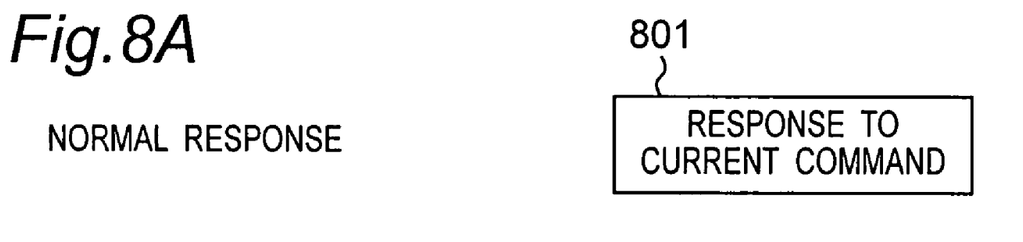
FIG. 8 is a diagram showing constitutions of responses according to the second embodiment of the present invention.

FIG. 8 is a diagram showing a configuration of a response to be transmitted by the IC card 102 to the host device 101. FIG. 8A shows the normal response which includes a response 801 to the current command transmitted from the host device 101.

Figure 8B:
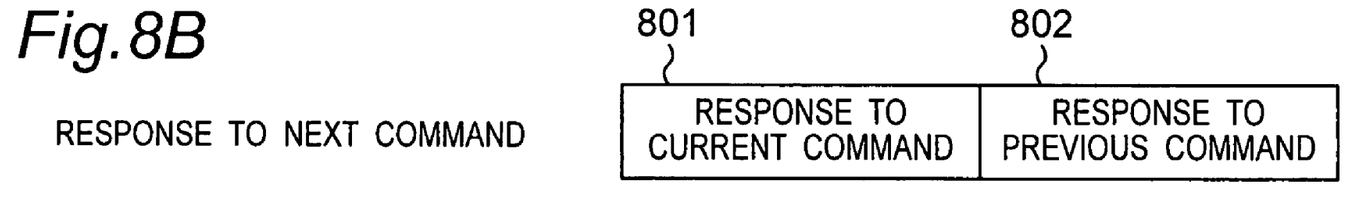

FIG. 8B shows the response to a next command transmitted from the host device after the second block size setting command in the second embodiment. The response to the next command in FIG. 8B includes both the response 801 to the current command (transmitted after the second block size setting command) and a response 802 to the previous command (which is the second block size setting command). The response 802 to the previous command includes Ack information or error information about the setting of the block size.

In FIG. 7, the host device 101 transmits the second block size setting command (step 401, numeral 201 in FIG. 2).

The interface section 111 of the IC card receives the second block size setting command (step 402). The IC card 102 transmits the response to the host device 101 (step 403, numeral 202 in FIG. 2).

The host device 101 receives the response 202 (step 404). The host device 101 transmits the block size setting data via the data line 132 (step 405, 203 in FIG. 2).

The IC card receives the block size setting data 203 (step 406). The block size storage section 121 of the IC card 102 stores the block size set by the host device 101 (step 407).

The comparison section 123 of the IC card 102 compares the block size stored in the block size storage section 121 with the size of the data buffer 113 stored in the buffer capacity storage section 122 (step 503).

When the size of the data buffer 113 is not less than the block size, the response creating section 124 creates Ack information (step 701). When the size of the data buffer 113 is less than the block size, the response creating section 124 creates error information (step 702).

The host device 101 transmits a next command (step 703). The IC card 102 receives the next command (step 704). The IC card 102 adds the Ack information or the error information as the response 802 of the previous command to the response 801 to the next command so as to transmit it to the host device (step 705, numeral 205 in FIG. 2).

When the host device 101 receives the response (step 706), it determines whether the response 205 includes error information about the block size (step 707). When the response 205 does not include error information about the block size (that is, the response includes the Ack information), the host device 101 processes the received response to the next command (step 708).

When the response includes error information about the block size, the host device 101 transmits the command for requesting transmission of the data buffer capacity of the IC card 102 (step 511).

When the IC card 102 receives the command for requesting transmission of the data buffer capacity of the IC card 102 (step 512), it transmits the capacity of the data buffer 113 stored in the buffer capacity storage section 122 to the host device 101 (step 513).

When the host device 101 receives the data buffer capacity of the IC card (step 514), it determines a new block size which is not more than the data buffer capacity (step 515). The sequence returns to step 401, and the host device 101 transmits the second block size setting command to the IC card so as to set the block size.

Immediately after the IC card according to the second embodiment of the present invention receives the block size setting data, it can inform the host device of error information about the block size. As a result, even if the block size is set improperly, the IC card can cope with this immediately.

In the first embodiment, the host device 101 and the IC card 102 may use the method of FIG. 6 instead of the method of FIG. 3 to set the block size in the IC card. In this case, when the block size set by the host device 101 is larger than the capacity of the built-in data buffer 113, the IC card transmits error information included in the response to the first block size setting command.

In the second embodiment, the host device 101 and the IC card 102 may use the method in FIG. 3 instead of the method in FIG. 6. When the host device 101 transmits either the first block size setting command or the second block size setting command, the IC card 102 adds Ack information or error information as a response to the previous command (which is the first or second block size setting command) to a response to the next command so as to transmit the response to the host device.

Although the present invention has been described with respect to its preferred embodiments in some detail, the disclosed contents of the preferred embodiments may change in the details of the structure thereof, and any changes in the combination and sequence of the component may be attained without departing from the scope and spirit of the claimed invention.

INDUSTRIAL APPLICABILITY

The present invention is useful as the electronic apparatus that executes the multi-block transmission with the host device, the control method thereof, the host device and the control method thereof.

The invention claimed is:

1. An electronic apparatus comprising:
an interface section that communicates with a host device through a command and response line and a data line, wherein:
a command and a response are transmitted through the command and response line, and data is transmitted through the data line;
the command, the response and the data are transmitted in this order between the electronic apparatus and the host device;
the transmitted data is divided into data blocks with a block size specified by the host device when a length of the data is at least a predetermined length; and
the interface section receives, via the command and response line, a block size setting command which informs the electronic apparatus that information specifying the block size is to be transmitted via the data line without specifying the actual block size via the command and response line, transmits a response acknowledging receipt of the block size setting command via the command and response line after receiving the block size setting command, and then receives the information specifying the block size via the data line after transmitting the response acknowledging receipt of the block size setting command;
a storage section that stores the received information specifying the block size; and
a data buffer that stores data, wherein
when the specified block size is larger than a capacity of the data buffer, the interface section includes error information indicating that the specified block size is larger than the capacity of the data buffer in a response acknowledging receipt of a command different from the block size setting command, and transmits the response including the error information to the host device.

2. The electronic apparatus according to claim 1, wherein:
the different command, which is the command different from the block size setting command, is a data block transmitting/receiving command which informs the electronic apparatus of transmitting or receiving the data blocks of the specified block size; and
the electronic apparatus includes the error information indicating that the specified block size is larger than the capacity of the data buffer in a response acknowledging receipt of the data block transmitting/receiving command and transmits the response, and does not accept the data blocks when the data blocks are transmitted from the host device via the data line.

3. The electronic apparatus according to claim 1, wherein:
the different command, which is the command different from the block size setting command, is a next command which is transmitted from the host device immediately after the block size setting command; and
the electronic apparatus adds the error information indicating that the specified block size is larger than the capacity of the data buffer to a response acknowledging receipt of the next command, and then transmits the response.

4. The electronic apparatus according to claim 1, wherein in a case that the interface section receives a command including information specifying the block size of the data block from the host device via the command and response line and the specified block size included in the received command is larger than the capacity of the data buffer,
when the electronic apparatus receives a data block transmitting/receiving command which informs the electronic apparatus of transmitting or receiving the data blocks of the specified block size from the host device, the electronic apparatus transmits a response acknowledging receipt of the data block transmitting/receiving command including error information indicating that the specified block size is larger than the capacity of the data buffer, and when the data blocks are transmitted from the host device, the electronic apparatus does not accept the data blocks, or
when the electronic apparatus receives a next command which is transmitted immediately after the command including information specifying the block size, the electronic apparatus adds the error information indicating that the specified block size is larger than the capacity of the data buffer to a response acknowledging receipt of the next command, and then transmits the response.

5. The electronic apparatus according to claim 1, which is an IC card.

6. A host device comprising:
an interface section that communicates with an electronic apparatus through a command and response line, wherein: and a data line
a command and a response are transmitted through the command and response line, and data is transmitted through the data line;
the command, the response and the data are transmitted in this order between the electronic apparatus and the host device;
when the data is at least a predetermined length, the interface section transmits or receives data blocks with a predetermined block size created by dividing the data;
the interface section transmits, via the command and response line, a block size setting command which informs the electronic apparatus that information specifying the block size of the data blocks is to be transmitted via the data line without specifying the actual block size via the command and response line, receives a response acknowledging receipt of the block size setting command after transmitting the block size setting command, and then transmits the information specifying the block size of the data block via the data line after receiving the response acknowledging receipt of the block size setting command; and
when the interface section transmits a command different from the block size setting command and receives a response to the different command, and when the response includes error information indicating that the specified block size is larger than a capacity of data buffer in the electronic apparatus, the interface section transmits an inquiry about a data capacity of the data buffer to the electronic apparatus through the command and response line, determines a new block size which is not more than the capacity of the data buffer in the electronic apparatus based on a response corresponding to the inquiry, and sets the new block size to the electronic apparatus.

7. The host device according to claim 6, wherein the different command, which is the command different from the block size setting command, is a data block transmitting/receiving command which informs the electronic apparatus of transmitting or receiving the data blocks with the specified block size.

8. The host device according to claim 6, wherein the different command, which is the command different from the block size setting command, is a next command which is transmitted immediately after the block size setting command.

9. A control method of an electronic apparatus comprising:
receiving a block size setting command transmitted from a host device via a command and response line, wherein the block size setting command informs the electronic apparatus that information specifying a block size of data blocks is to be transmitted via the data line without specifying the actual block size via the command and response line when data with at least a predetermined length is divided into a plurality of data blocks;
transmitting a response acknowledging receipt of the block size setting command via the command and response line to the host device after receiving the block size setting command, and receiving information specifying the block size via a data line after transmitting the response acknowledging receipt of the block size setting command;
determining whether the block size included in the received information is larger than a capacity of a built-in data buffer; and
including error information indicating that the specified block size is larger than the capacity of the data buffer in a response acknowledging receipt of a different command from the block size setting command and transmitting the response including error information to the host device, when the block size included in the received information is larger than the capacity of the built-in data buffer.

10. The control method of the electronic apparatus according to claim 9, wherein:
the block size is a specified block size;
the different command, which is the command different from the block size setting command, is a data block transmitting/receiving command which informs the electronic apparatus of transmitting or receiving the data blocks with the specified block size; and
the electronic apparatus includes the error information indicating that the specified block size is larger than the capacity of the data buffer in a response acknowledging receipt of the data block transmitting/receiving command, and does not accept the data blocks when the host device transmits the data blocks.

11. The control method of the electronic apparatus according to claim 9, wherein:
the different command, which is the command different from the block size setting command, is a next command which is transmitted immediately after the block size setting command from the host device; and the electronic apparatus adds the error information indicating that the specified block size is larger than the capacity of the data buffer to a response acknowledging receipt of the next command, and then transmits the response.

12. The control method of the electronic apparatus according to claim 9, further comprising:

receiving a command including information specifying the block size of the data block from the host device via the command and response line; and determining whether the block size included in the received command is larger than the capacity of the data buffer, wherein in a case where the block size is larger than the capacity of the data buffer, when the electronic apparatus receives a data block transmitting/receiving command which informs the electronic apparatus of transmitting or receiving the data blocks with the block size from the host device, the electronic apparatus transmits a response acknowledging receipt of the data block transmitting/receiving command including error information indicating that the specified block size is larger than the capacity of the data buffer, and when the data blocks are transmitted from the host device, the electronic apparatus does not accept the data blocks, or when the electronic apparatus receives a next command which is transmitted immediately after the block size setting command, the electronic apparatus adds the error information indicating that the specified block size is larger than the capacity of the data buffer to a response acknowledging receipt of the next command, and then transmits the response.

13. The control method of the electronic apparatus according to claim 9, wherein the electronic apparatus is an IC card.

14. A control method of a host device comprising:

transmitting a block size setting command via a command and response line to an electronic apparatus, wherein the block size setting command informs the electronic apparatus that information specifying a block is to be transmitted via the data line without specifying the actual block size via the command and response line when data with at least a predetermined length is divided into a plurality of data blocks;

receiving a response acknowledging receipt of the block size setting command via the command and response line from the electronic apparatus after transmitting the block size setting command, and transmitting the information specifying a block size via the data line to the electronic apparatus after receiving the response acknowledging receipt of the block size setting command, wherein when transmitting a command different from the block size setting command and receiving a response acknowledging receipt of the different command, and when the response acknowledging receipt of the different command from the block size setting command includes error information indicating that the specified block size is larger than a capacity of a data buffer in the electronic apparatus, inquiring about a data capacity of a data buffer of the electronic apparatus;

determining a new block size which is not more than the capacity of the data buffer in the electronic apparatus based on a response corresponding to the inquiring operation; and setting the new block size to the electronic apparatus.

15. The control method of the host device according to claim 14, wherein the block size is a specified block size, and the different command, which is the command different from the block size setting command, is a data block transmitting/receiving command which informs the electronic apparatus of transmitting or receiving the data blocks with the specified block size.

16. The control method of the host device according to claim 14, wherein the different command, which is the command different from the block size setting command, is a next command which is transmitted to the electronic apparatus immediately after the block size setting command.

* * * * *